United States Patent
Zbikowski et al.

(10) Patent No.: US 7,780,559 B2
(45) Date of Patent: Aug. 24, 2010

(54) CHAIN TRANSMISSION

(76) Inventors: Jerzy Andrzej Zbikowski, Ul. Stefana Wyszynskiego 7/18, PL-65-536, Zielona Gora (PL); Marek Grzegorz Terelak, Ul. Zeromskiego 20c/3, PL 59-220, Legnica (PL); Zbigniew Zbikowski, Ul. Stefana Wyszynskiego 7/18, PL-65-536, Zielona Gora (PL); Radoslaw Wrona, Przylep, Ul. 22 Lipca 6A/312, PL-65-526, Zielona Gora (PL)

( * ) Notice: Subject to any disclaimer, the term of this patent is extended or adjusted under 35 U.S.C. 154(b) by 341 days.

(21) Appl. No.: 11/572,706

(22) PCT Filed: May 27, 2005

(86) PCT No.: PCT/PL2005/000034

§ 371 (c)(1),
(2), (4) Date: Jan. 25, 2007

(87) PCT Pub. No.: WO2006/011820

PCT Pub. Date: Feb. 2, 2006

(65) Prior Publication Data

US 2007/0213156 A1    Sep. 13, 2007

(30) Foreign Application Priority Data

Jul. 26, 2004  (PL) ................................. 369279

(51) Int. Cl.
  *F16G 13/07*  (2006.01)
(52) U.S. Cl. ................................... 474/213
(58) Field of Classification Search .......... 474/212, 474/213, 206, 209, 148
  See application file for complete search history.

(56) References Cited

U.S. PATENT DOCUMENTS

| | | | | |
|---|---|---|---|---|
| 550,541 A | * | 11/1895 | Simpson | ............... 474/148 |
| 1,140,319 A | * | 5/1915 | Van Houten | ............... 474/213 |
| 3,079,807 A | | 3/1963 | Hornsteiner | |
| 5,092,822 A | * | 3/1992 | Wakabayashi | ............... 474/209 |
| 5,222,920 A | * | 6/1993 | Cheesman et al. | ............... 474/213 |
| 6,440,022 B1 | | 8/2002 | Ichikawa et al. | |
| 2003/0017896 A1 | | 1/2003 | Markley et al. | |
| 2005/0070389 A1 | * | 3/2005 | Morishige | ............... 474/213 |

FOREIGN PATENT DOCUMENTS

| | | | |
|---|---|---|---|
| BE | 438 048 A | | 3/1940 |
| BE | 0438048 A | * | 3/1940 |
| DE | 54 663 C | | 12/1890 |
| DE | 0054663 C | * | 12/1890 |
| DE | 86 046 C | | 4/1896 |
| DE | 0086046 C | * | 4/1896 |
| DE | 196 22 054 A1 | | 12/1996 |
| GB | 230839 | | 8/1925 |
| WO | WO/95/04889 | | 2/1995 |

* cited by examiner

*Primary Examiner*—John Q Nguyen
*Assistant Examiner*—Robert T Reese
(74) *Attorney, Agent, or Firm*—Norton R. Townsley; Belasco Jacobs & Townsley, LLP

(57) ABSTRACT

A chain transmission containing two toothed sprockets, a chain and a tensioner where the center (S) of the pitch circle of the driven sprocket (2) lays outside of the circle inscribed by the part of chain (4) mating with the driven sprocket (2). Each link (5,6) of the chain (4) contains plates (7) connected by three pins (8 and 9), while the axis of one of the pin (9) lays outside of the plane determined by axes of the remaining pins (8) of the link (5, 6).

5 Claims, 2 Drawing Sheets

CHAIN TRANSMISSION

CROSS-REFERENCE

The Applicants claim the priority of their Patent Cooperation Treaty Application, No. PCT/PL2005/000034, filed May 27, 2005.

BACKGROUND OF THE INVENTION (1) Field of the Invention

The subject of the invention concerns a chain transmission used in machine drives.

(2) Description of the Related Art

A book of M. Dudziak "String transmission", WN PWN, Warsaw 1997, page 246-253 describes a chain transmission consisting of at least two sprockets partially encircled by a chain. A chain consists of a series of links connected through articulated joint. For correct positioning of the chain on the sprockets, a slight overhang is required, which is adjusted periodically or continuously by use of a tensioner. The tensioner allows correct operation of the transmission when the chain lengthens in course of time, mainly because of abrasive wear of its elements. Generally used in chain transmissions are roller pitch chains, consisting of alternately inner and outer links consisting of outer plates, pins, inner plates, sleeves and rollers. By using appropriately lengthened pins and putting outer and inner plates alternately on them, it is possible to build a multiple pitch chain.

Another common type of chain is the toothed roller chain, composed of appropriately shaped plates, each of them having two protrusions on one of their longer edges, which are teeth corresponding in form with the sprocket teeth and building a chain transmission together with a chain. The second edge of the longer edges of the plate is smooth. The plates have two holes in which pins connecting adjoining chain links are located.

From patent abstract no. GB 230839 is known a chain transmission, where the chain has each link equipped with two teeth on one side and is smooth on the other side. The ends of each chain link are formed like the edges of sprockets teeth with which they mate.

From patent abstract no. U.S. Pat. No. 6,440,022 is known a mutual toothed chain containing in longitudinal and crosswise direction alternately laid first and second links. Each first chain link consists of an odd number of connectors laid in the crosswise direction of the chain, and each second chain link consists of even numbers of connectors and pins laid in crosswise direction, where each of them is adjusted to connect two oppositely laid chain links. The connectors of the first chain link and connectors of the second chain link have the same side profile; so that on one side two teeth are laid and the second side is smooth. On each first and second chain link, teeth of the extreme connectors are directed outside and teeth of internal connectors are directed opposite.

From patent abstract no. US 2003/0017896 is known a toothed sprocket having chain transmitting power which consists of links. The sprocket has teeth radially protruding and spreading for a distance of the chain links' length. The chain has two rows of driving and driven, alternately laid links which are connected by pins. Both rows of links alternate along the chain, so that the lines of links in the second row are laid between links from adjoining lines of the first row, and lines of links from the first row are laid between links from adjoining lines of the second row.

From patent abstract no. W095/04889 is known a self-tightening driving chain, in which the length of the moving chain and its tension are constant despite the changing distance between driving and driven sprockets. Tension is achieved by means of appropriately adjusting the off-centre free sprocket. The off-centre free sprocket presents an axis for two arms set in a "V" shape which support the chain drive and linearly separate driven sprockets, which are set in the end of the arms, thereby enabling their appropriate tread. The off-centre free sprocket is encircled by a chain at least in part of free toothed sprocket, both on the side of driving sprocket and on the side of driven sprocket.

The above described solutions do not allow achievement of the same rotational speed of toothed driving and driven sprockets of different diameters while transmitting power through one chain. Development of a chain transmission which will allow driving and driven sprockets of different diameters in a chain transmission to achieve the same rotational speed represents a great improvement in the field of transmissions and satisfies a long felt need of the transmission engineer.

SUMMARY OF THE INVENTION

The present invention is free from the inconveniences described above. The present invention is a chain transmission which contains two toothed sprockets, a chain and a tensioner, where the centre of pitch circle of the driven sprocket lays outside of the circle inscribed in the part of chain mating with the sprocket. The chain consists of links connected by pins, where each link contains plates connected by three pins, while the axis of one of the pins lays outside of the plane determined by the axes of the remaining pins of the link. The chain transmission according to the invention allows the toothed sprockets of different diameters to achieve the same rotational speed while transmitting power through one chain.

An appreciation of the other aims and objectives of the present invention and an understanding of it may be achieved by referring to the accompanying drawings and description of a preferred embodiment.

DETAILED DESCRIPTION OF THE PREFERRED EMBODIMENT

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
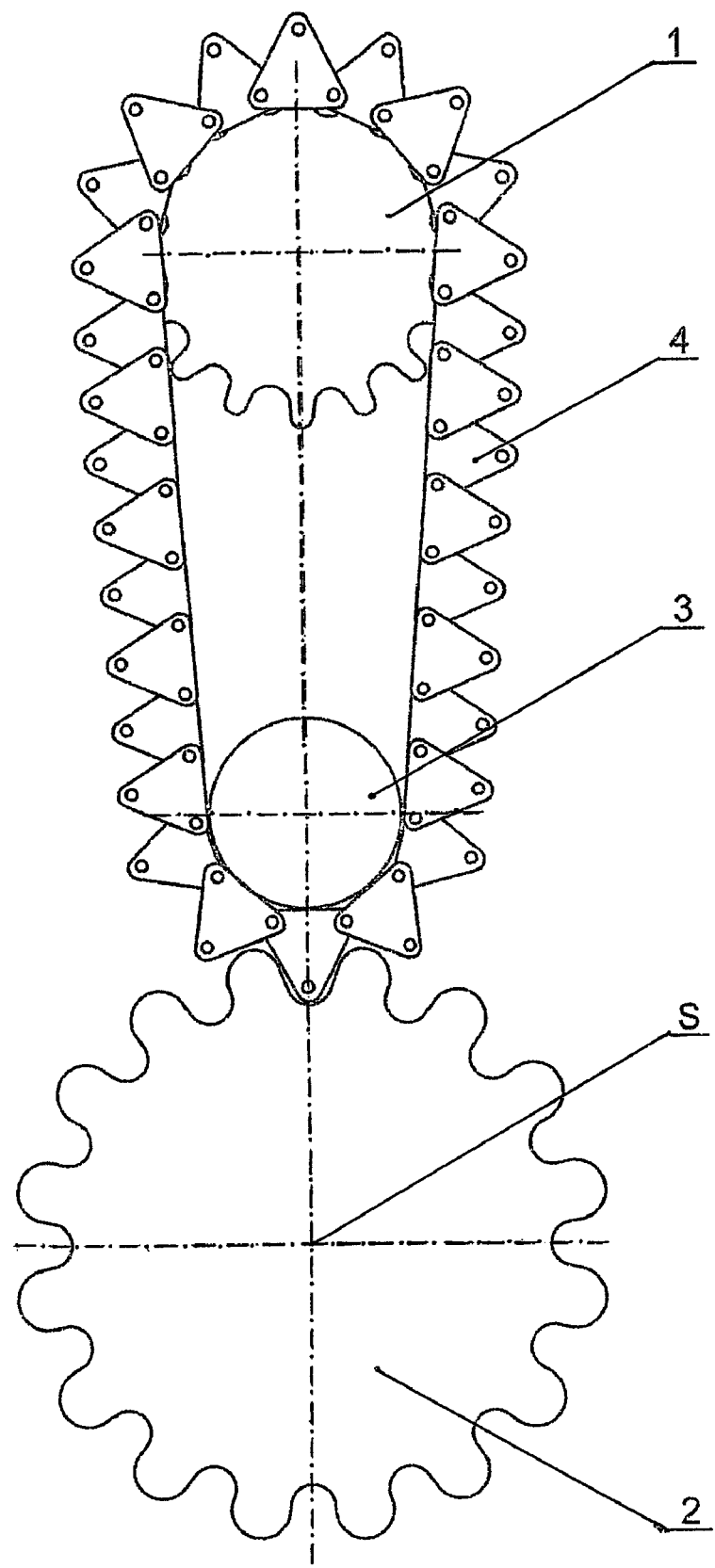
FIG. 1 is a schematic diagram of the chain transmission of the instant invention.
Figure 2:
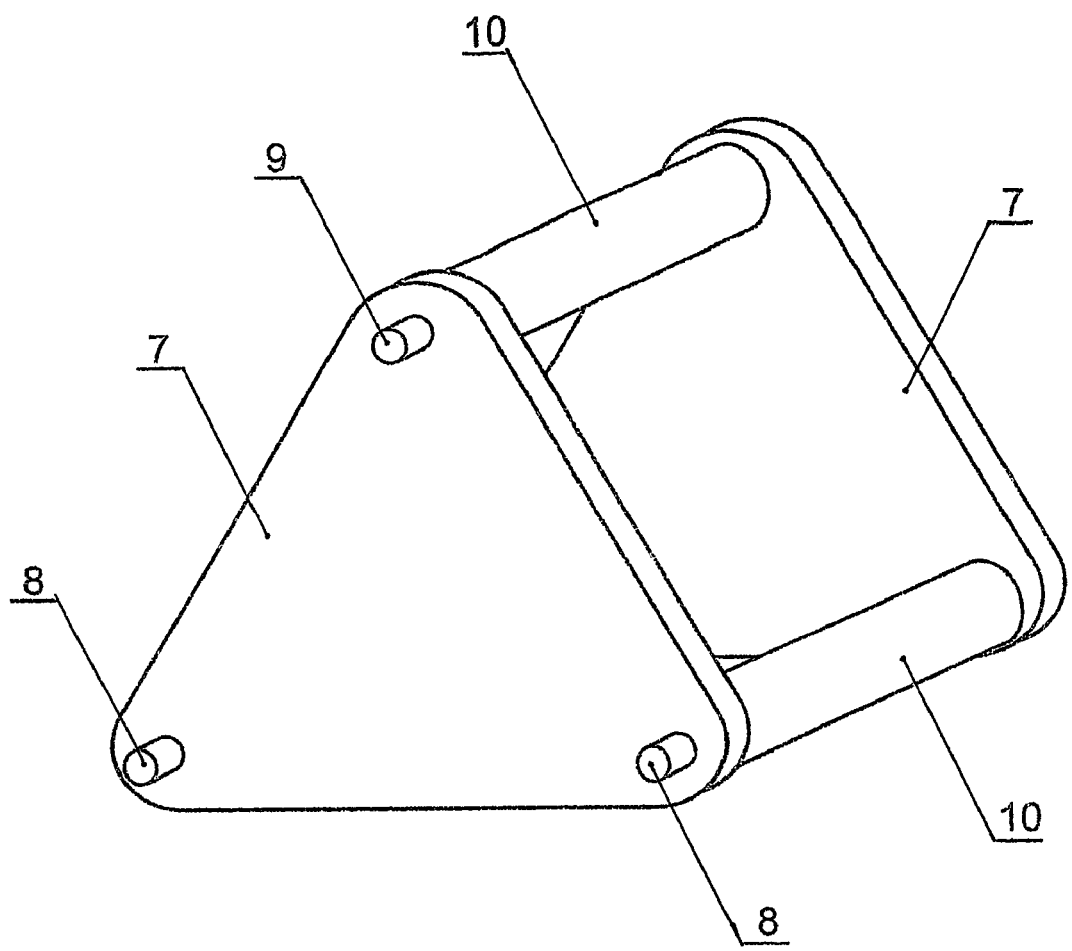
FIG. 2 is an axonometric projection of one link of the chain of the instant invention.
Figure 3:
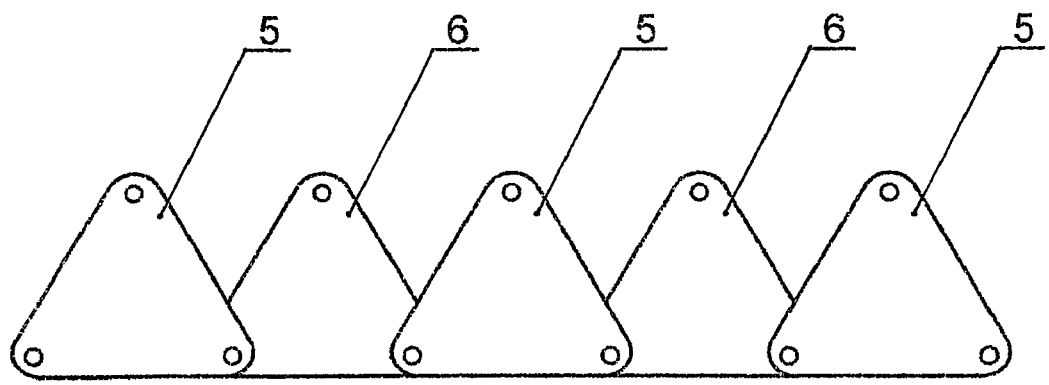
FIG. 3 is s schematic diagram of a section of links in the chain of the instant invention.

The subject of the invention is shown in examples in drawings, where FIG. 1 illustrates the chain transmission, FIG. 2 illustrates one chain link, and FIG. 3 illustrates a chain fragment.

The transmission is located in one plane. It comprises: a driving toothed sprocket 1, a driven toothed sprocket 2, a tension roller 3, and a chain 4. Sprockets 1 and 2 engage with each other by means of chain 4 encircling the driving sprocket 1, tensioned and pressed against the driven sprocket 2 by tensioner 3. The driven toothed sprocket 2 is not encircled by chain 4. Chain 4 consists of outer links 5 and inner links 6 laid alternately along the chain's 4 length. Each of links, 5 and 6, of chain 4 comprises a pair of parallel, triangular plates 7, connected together at their bases by two base pins 8 and at their top by a single top pin 9. Between plates 7, base rollers 10 are put onto the base pins 8 and a top roller 11 is put onto the top pin 9. Base pins 8 at bases of the plates 7 connect simultaneously two adjoining links 5 and 6 forming an articulated joint enabling the links 5 and 6 to encircle sprocket 1 and tension roll 3. The centre of pitch circle S of the driven sprocket 2 lays outside of the circle inscribed by the part of chain 4 mating with the sprocket 2. The diameter of the inscribed circle equals the diameter of the tension roller 3. Both toothed sprockets, driving sprocket 1 and driven sprocket 2, have different pitch diameters with the same number of teeth so that while operating, they rotate with the same speed.

Thus the closed path described by movement of the top pins 9 lies outside of the closed path described by movement of the base pins 8. Also, the distance between the base pins 8 is fixed, and the distance between the base rollers 10 corresponds to the distance between the teeth of the driving sprocket 1, while the distance between the top rollers 11 varies around the closed path and, in the area where the chain 4 meshes with the driven sprocket 2, corresponds to the distance between teeth of the driven sprocket 2. As a consequence, the distance between the top pins 9 and rollers 11 becomes larger than the distance between the base pins 8 and rollers 10 in the area where the chain 4 meshes with the driven sprocket 2.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A chain transmission comprising:
   a) a single driving sprocket;
   b) a single tension roller;
   c) a single driven sprocket; and
   d) a chain encircling said driving sprocket and said tension roller; said chain traversing an approximately semicircular path around said tension roller when in contact with said driven sprocket; said chain mesh with said driving sprocket and said driven sprocket; said tension roller tensioning said chain along its entire length and pressing said chain against said driven sprocket; said driving sprocket and tension roller being inside said chain; said driven sprocket being outside said chain;
   said chain comprising: a plurality of alternating outer links and inner links connected to each other; each of said links comprising:
      a) a pair of solid, planar, spaced apart, equilateral triangular plates of identical size and shape, each having a base and a top;
      b) two base pins;
      c) a top pin;
      d) two base rollers; and
      e) a top roller;
   said plates joined together by said base pins at said base and said top pin at said top with said base roller entirely between said plates and rotatably mounted on each of said base pins and said top roller entirely between said plates and rotatably mounted on said top pin: said base pins also connecting together alternating outer overlapping links and inner overlapped links; said plates being spaced apart sufficiently to permit the teeth of said driving sprocket to pass between said plates; only the bottom rollers engage the driving sprocket, and only the top rollers engage the driven sprocket.

2. A chain transmission as claimed in claim 1 in which the center of pitch of the driven sprocket lays outside of the circle inscribed by the part of the chain mating with said driven sprocket.

3. A chain transmission as claimed in claim 1 in which the closed path described by movement of said top pin lies outside of the closed path described by movement of said base pins.

4. A chain transmission as claimed in claim 3 in which: the distance between said base rollers corresponds to the distance between the teeth of the driving sprocket; the distance between said top rollers varies around said closed path; and, in the area where said chain meshes with said driven sprocket, the distance between said top 5 rollers corresponds to the distance between teeth of the driven sprocket.

5. A chain transmission as claimed in claim 3 in which distance between said top pins and rollers becomes larger than the distance between said base pins and rollers in the area where the chain meshes with the driven sprocket.

* * * * *